(12) United States Patent  
Chen

(10) Patent No.: US 6,628,096 B1  
(45) Date of Patent: Sep. 30, 2003

(54) LINEAR SINUSOIDAL WAVEFORM SPINDLE DRIVER AND METHOD FOR DRIVING A POLYPHASE, BRUSHLESS DC MOTOR USING COMMUTATION CURRENTS WITH USER CONTROLLED RISE AND FALL TIMES

(75) Inventor: Ching-Siang Chen, Laguna Niguel, CA (US)

(73) Assignee: Texas Instruments Incorporated, Dallas, TX (US)

( * ) Notice: Subject to any disclaimer, the term of this patent is extended or adjusted under 35 U.S.C. 154(b) by 133 days.

(21) Appl. No.: 09/664,248

(22) Filed: Sep. 18, 2000

(51) Int. Cl.[7] .......................... H02K 23/00; H02P 1/18; H02P 3/08; H02P 5/06; H02P 7/06
(52) U.S. Cl. ...................... 318/254; 318/597; 318/123; 318/807
(58) Field of Search ................................ 318/597, 123, 318/767–768, 771, 780, 801, 807, 809, 812, 254

(56) References Cited

U.S. PATENT DOCUMENTS 5,869,946 A * 2/1999 Carobolante ................ 318/811
5,886,489 A * 3/1999 Rowan et al. ............... 318/439
6,016,043 A * 1/2000 Motzko et al. .............. 318/801
6,160,368 A * 12/2000 Plutowski .................... 318/375
6,268,772 B1 * 7/2001 Chen ........................... 318/432
6,369,541 B1 * 4/2002 Albert ......................... 318/560

OTHER PUBLICATIONS

Application Note: "SilentSpin Technology Acoustic Noixe Reduction", Total Solutions 99, Texas Instruments Storage Products Group, pp. 1–10, Mar. 13, 1997.

* cited by examiner

Primary Examiner—Marlon T. Fletcher  
(74) Attorney, Agent, or Firm—W. Daniel Swayze, Jr.; W. James Brady; Frederick J. Telecky, Jr.

(57) ABSTRACT

A circuit and method for providing drive currents to a polyphase dc motor are presented. The circuit (40) includes a circuit for generating a user-defined waveform first. signal in synchronism with a reference frequency signal. A reference frequency signal generator (62) generates pulses of a second signal at a reference frequency. A commutation circuit (56) combines segments of the first and second signals, and a circuit (64) is provided for applying the combined sinusoidal/trapezoidal waveforms to coils of the polyphase dc motor in a commutative sequence. Preferably, the user-defined waveform, when combined with the second signal, has approximately a sinusoidal/trapezoidal waveform.

18 Claims, 9 Drawing Sheets

LINEAR SINUSOIDAL WAVEFORM SPINDLE DRIVER AND METHOD FOR DRIVING A POLYPHASE, BRUSHLESS DC MOTOR USING COMMUTATION CURRENTS WITH USER CONTROLLED RISE AND FALL TIMES

BACKGROUND OF THE INVENTION

1. Field of the Invention

This invention relates to improvements in methods and circuits for driving brushless, polyphase dc motors, such as a spindle motor of a hard disk drive, or the like, and more particularly to improvements in such driving methods and circuits that at least reduce the acoustic and electrical noise in motors of this type using driving voltages having substantially sinusoidal or trapezoidal waveforms.

2. Related Background

In the operation of a polyphase dc motor, a dc current is commutatively applied to the coils of the motor. In the past, the current that is applied has a square waveform when it is switched from one coil set to the next. The square waveform produces many high frequency components, and, additionally, requires large amounts of power. As the power requirements for hard disk drives and the like are reduced, much emphasis has attached to efforts to reduce the driving currents required for the motor. Each square wave commutation results in many voltage and current spikes, which are undesirable.

The physical size of the drives also is being reduced, for example, for use in laptop computers, or the like. The reduced sized drives use less power, for example, due to the lessened need of drives of smaller size for such high commutation currents in operation. However, as the voltage of the hard disk drive is reduced, the drive becomes more sensitive to noise spikes.

Typically, the circuitry to spin the motor of the drive is contained on the same circuit board as the read channel electronics, which process the signals read from the mass data storage device. As a result, noise that occurs in the commutation/driver electronics may translate into noise that is undesirably transferred to the electronics in the read channel. As a result, it is desirable to reduce the noise and commutation spikes in the commutation/driver circuit as much as possible.

Efficient motor driver requires that the excitation current in the three motor phases be aligned with the back-emf generated on the three phases. One of the best schemes for achieving this alignment is the use of a phase-locked loop (PLL) that adjusts the phase and frequency of the commutation, so the back-emf of the un-driven winding passes through zero in the center of the appropriate commutation state. This scheme works well when the shape of the commutation waveforms includes an un-driven region, as in a conventional 6-state, +1, +1, 0, −1, −1, 0, sequence.

Since the +1, +1, 0, −1, −1, 0 sequence has sharp transitions between driving states, this sequence has many high frequency components. In addition to the undesirable effects discussed above, the high frequency components tend to excite mechanical resonance in the motor, which results in the creation of undesirable acoustic noise. Moreover, the step-function tristating of the undriven motor phase, together with the step-function driving waveform produce a degree of torque ripple in the motor. The torque ripple results in an unevenness or jerkiness in the motor rotation, which also excites resonance in the motor, also causing undesirable acoustic noise.

There has been recent emphasis on disk drive manufacturers to reduce the noise associated with disk drive motors. Consequently, what is needed is a disk drive and method for operating it in which the noise associated with the driver in operation is reduced or eliminated.

SUMMARY OF THE INVENTION

In light of the above, therefore, it is an object of the invention to provide an improved motor driver and method for operating it in which the noise associated with the driver in operation is reduced or eliminated.

It is still another object of the invention to provide a disk drive and method that employs multiple sinusoidal or trapezoidal drive signals, or the like, for application to the motor windings.

It is yet another object of the invention to provide a sinusoidally or trapezoidally shaped waveform for commutative switching and application to the coils of a polyphase dc motor.

It is still another object of the invention to provide a polyphase dc motor driver and method of operating it in which sinusoidally or trapezoidally shaped waveforms are commutatively applied to enable smoother and quieter operation with reduced torque ripple.

These and other objects, features and advantages of the invention will be apparent to those skilled in the art from the following detailed description of the invention, when read in conjunction with the accompanying drawings and appended claims.

Thus, in accordance with a preferred embodiment of the invention, a spindle current control system for use in a three-phase dc motor is presented. The control system provides a means to accurately control the spindle current in a user-defined waveform for minimizing acoustic/electrical noise and torque ripple. A method is also provided to generate a linear current ramp waveform is also presented. In addition, a circuit to generate a slew rate that is independent of variations in process and temperature is presented. A method to enable or disable each individual power amplifier associated with three phase windings is also presented.

In accordance with a broad aspect of the invention, a circuit is presented for providing drive currents to a polyphase dc motor. The circuit includes a circuit for generating a user-defined waveform first signal in synchronism with a reference frequency signal. A reference frequency signal generator generates pulses of a second signal at a reference frequency. A commutation circuit combines segments of the first and second signals, and a circuit is provided for applying the combined sinusoidal or trapezoidal waveforms to coils of the polyphase dc motor in a commutative sequence. Preferably, the user-defined waveform, when combined with the second signal, has approximately a sinusoidal or trapezoidal waveform.

According to another broad aspect of the invention, a method is presented for operating a polyphase dc motor. The method includes generating a commutation waveform, generating a user-defined waveform in synchronism with the commutation waveform, and combining the commutation waveform and the user-defined waveform to produce a combined waveform. The combined waveform is then applied to the windings of the motor. The combined waveform, preferably, has approximately a sinusoidal or trapezoidal waveform.

According to still another broad aspect of the invention, a method is presented for reducing acoustic noise in operating a polyphase dc motor. The method includes generating a commutation waveform, generating a user-defined waveform in synchronism with the commutation waveform, and combining the commutation waveform and the user waveform to produce a combined waveform. The combined waveform is then applied to the windings of the motor.

According to yet another broad aspect of the invention, a disk drive product of the type having a polyphase dc motor for rotating a data containing media is presented. The disk drive product has a circuit for generating a user-defined waveform first signal in synchronism with a reference frequency signal. A reference frequency signal generator generates pulses of a second signal at a reference frequency. A commutation circuit combines segments of the first and second signals, and a circuit applies the combined sinusoidal waveforms to coils of the polyphase dc motor in a commutative sequence.

According to still another broad aspect of the invention, a disk drive product of the type having a three-phase dc motor for rotating a data containing media is presented. The disk drive product has a plurality of circuits, each for driving a respective set of motor coils during a motor phase. Each of the plurality of circuits has a current waveform generator for generating a user-defined waveform first signal in synchronism with a reference frequency signal. A commutation state machine generates commutated motor driving second signals. A slew rate controlled power amplifier combines the first and second signals to produce driving signals to the respective set of motor coils.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
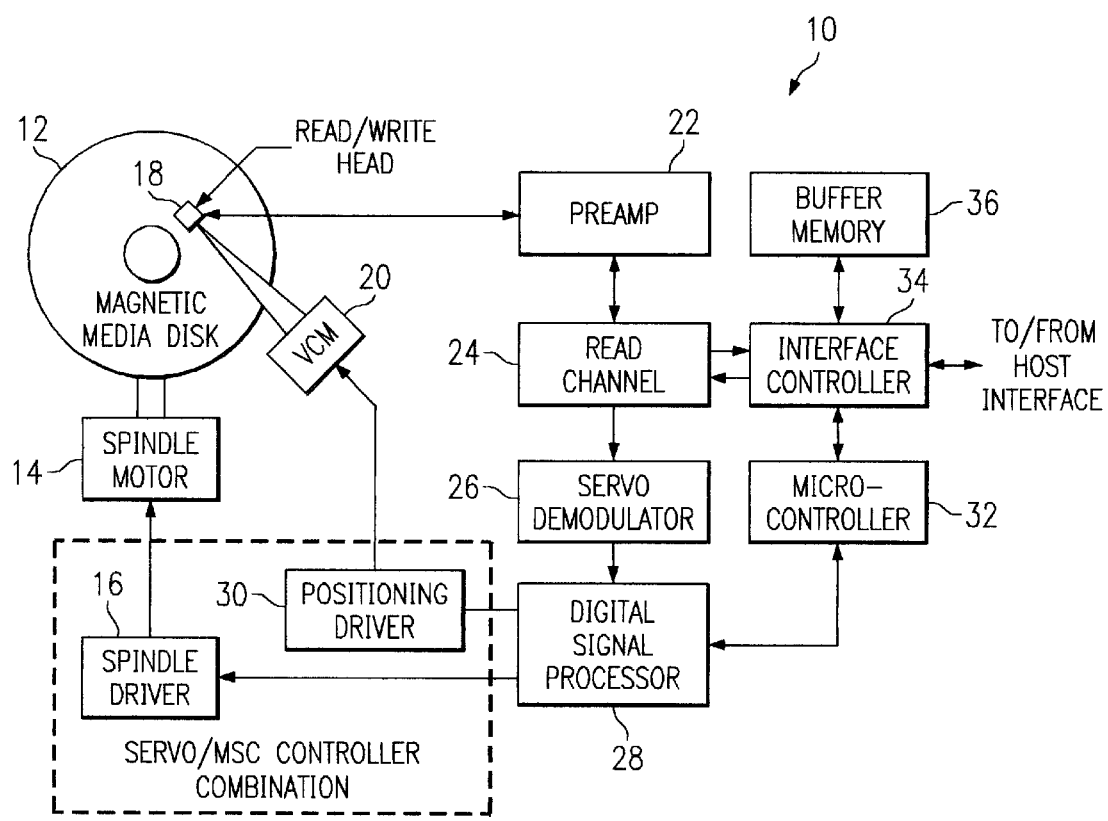
FIG. 1 is a block diagram of a generic disk drive invention may be practiced.

FIG. 1 is a block diagram of a generic disk drive system 10, which represents the general environment in which the invention may be practiced. The system 10 includes a magnetic media disk 12 that is rotated by a spindle motor 14 and spindle driver circuit 16. The spindle driver circuit 16 provides drive signals having controlled rise and fall waveforms that are commutatively applied to the spindle motor 14, in a manner below described in detail.

A data transducer or head 18 is locatable along selectable radial tracks (not shown) of the disk 12 by a voice coil motor 20. The radial tracks may contain magnetic states that contain information about the tracks, such as track identification data, location information, synchronization data, as well as user data, and so forth. The head 18 is used both to a record user data to and read user data back from the disk 12, as well as to detect signals that identify the tracks and sectors at which data is written, and to detect servo bursts that enable the head 18 to be properly laterally aligned with the tracks of the disk 12, as below described.

Analog electrical signals that are generated by the head 18 in response to the magnetic signals recorded on the disk 12 are preamplified by a preamplifier 22 for delivery to read channel circuitry 24. Servo signals are detected and demodulated by one or more servo demodulator circuits 26 and processed by a digital signal processor (DSP) 28 to control the position of the head 18 via the positioning driver circuit 30. The servo data that is read and processed may be analog data that is interpreted by the DSP for positioning the head.

A microcontroller 32 is typically provided to control the DSP 28, as well as an interface controller 34 to enable data to be passed to and from the host interface (not shown) in known manner. A data memory 36 may be provided, if desired, to buffer data being written to and read from the disk 12.

Figure 2:
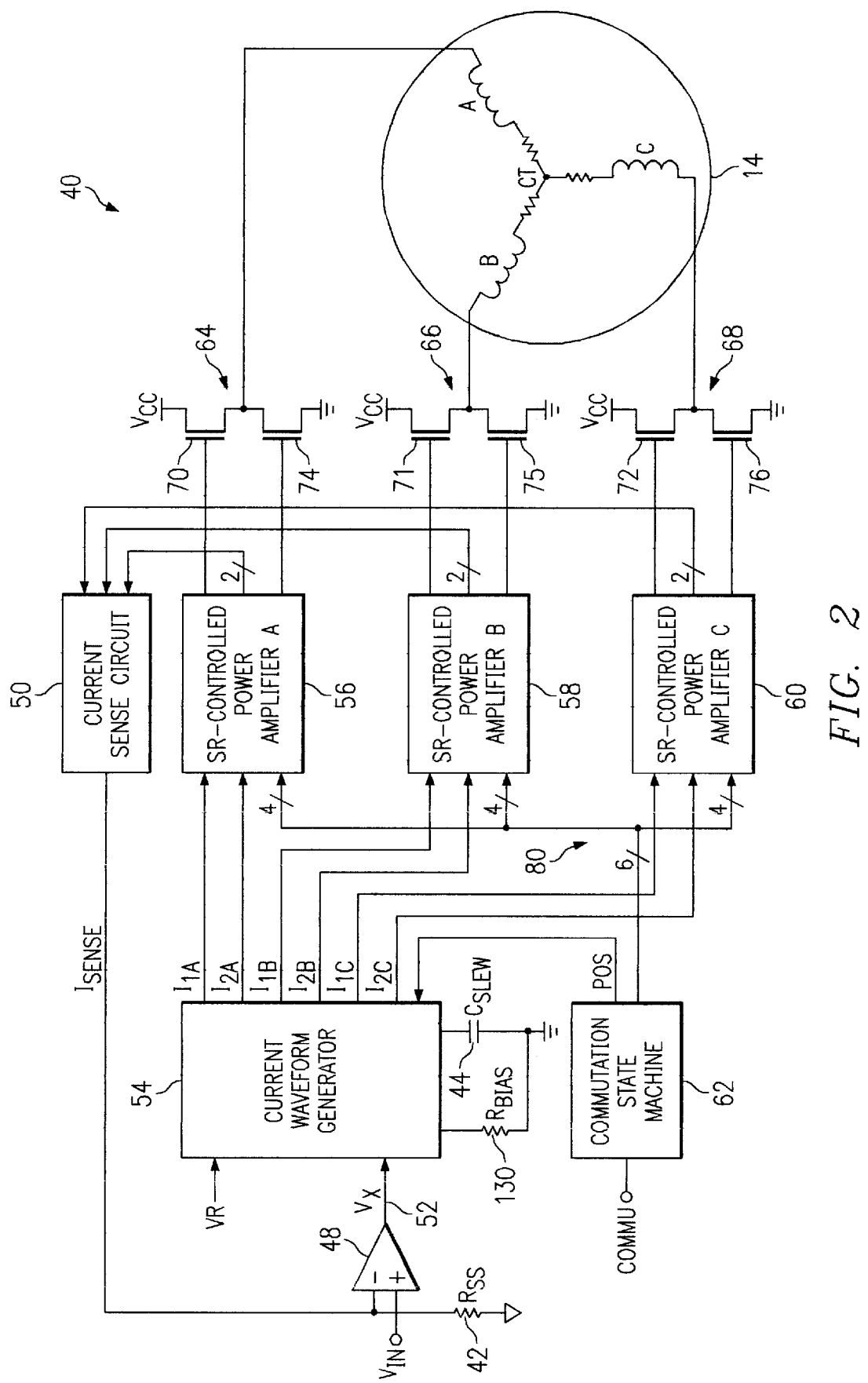
FIG. 2 shows a block diagram of a spindle current control system for a typical three-phase dc motor.

A block diagram of a spindle current control system 40 is shown in FIG. 2 to which reference is now additionally made. The system 40 is used to accurately control the current flowing through the windings A, B, and C of the spindle motor 14 with a user-defined slew rate. An external resistor $R_{SS}$ 42 sets the magnitude of the current. The transconductance of the loop is defined by $$Gm = \frac{I_{MOTOR}}{V_{IN}} = \frac{\beta}{R_{SS}}$$

where β is the ratio of the power FET to its mirror FET, as below described. An external capacitor $C_{SLEW}$ 44 sets the slew rate of the current, also as described below.

An input voltage $V_{IN}$ is applied at the noninverting node of an error amplifier 48. A sense current $I_{SENSE}$ from a current sense circuit 50 is converted into a voltage through the external resistor $R_{SS}$ 42. The voltage is then applied at the inverting node of the error amplifier 48. The resulting voltage of the error amplifier is provided on line 52 to a current waveform generator 54, which generates two sets of current sources whose slopes on transitions (both low-to-high and high-to-low) are controlled by the external capacitor $C_{SLEW}$ 44. Each set of the current sources has three identical current sources, which produce output currents denoted by I1A, I1B, I1C, and I2A, I2B, I2C, respectively, synchronized with the commutation frequency. Currents I1A and I2A are applied to a slew-rate controlled power amplifier A 56, where the two current waveforms are mirrored and amplified with a factor of "β" to the motor winding "A". The current sense circuit 50 detects the currents in the respective mirror FETs and outputs the sense current $I_{SENSE}$, which is fed back to the error amplifier 48, described above, thus completing the spindle current control loop. Similar connections are provided for currents I1B and I2B to slew-rate controlled power amplifier B 58, and currents I1C and I2C to slew-rate controlled power amplifier C 60. The slew-rate controlled power amplifiers A 56, B 58, and C 60 are controlled by a commutation state machine 62, which is controlled by a control signal COMMU, as shown, with which the currents I1A, I1B, I1C, and I2A, I2B, I2C are synchronized.

To achieve an object of the invention, a commutatively switched current waveform that is approximately sinusoidally or trapezoidally shaped is applied to the coils of the motor. By virtue of the sinusoidally or trapezoidally shaped waveform, the operation of the polyphase dc motor is made smoother, quieter, and with reduced torque ripple. The ultimate goal is to develop and apply the waveforms shown in FIG. 4 to the coils of the motor. The current waveforms labeled I1 and I2 are combined in various combinations to produce the driving currents IA, IB, and IC. It should be noted that the lowest current values of I1 and I2 are referenced at zero and that the midpoint value in IA, IB, and IC are referenced to zero. The currents are separately generated from the commutation signals, but are in synchronism with them because of the commutation state signal COMMU from which both are developed. The signals IA, IB, and IC are approximately sinusoidal or trapezoidal, but can be further smoothed out easily with additional filtering for optimal performance.

More particularly, the currents from the slew-rate controlled power amplifiers A 56, B 58, and C 60 are applied to the motor coils A, B, and C by respective power FET circuits 64, 66, and 68 in six commutation states, denoted by Φ1–6. The six commutation states are required to properly spin the three-phase spindle dc motor. During the commutation state Φ1, the high-side power FET of "A" and the low-side power FET of "B" are conducting so that the motor current flows from the winding "A" to the winding "B" and the winding "C" is tri-stated. The complete sequence of commutation is tabulated in the following Table I.

TABLE I

| | Highside | | | Lowside | | |
|---|---|---|---|---|---|---|
| | A | B | C | A | B | C |
| φ1 | ON | OFF | OFF | OFF | ON | OFF |
| φ2 | ON | OFF | OFF | OFF | OFF | ON |
| φ3 | OFF | ON | OFF | OFF | OFF | ON |
| φ4 | OFF | ON | OFF | ON | OFF | OFF |
| φ5 | OFF | OFF | ON | ON | OFF | OFF |
| φ6 | OFF | OFF | ON | OFF | ON | OFF |

Figure 3:
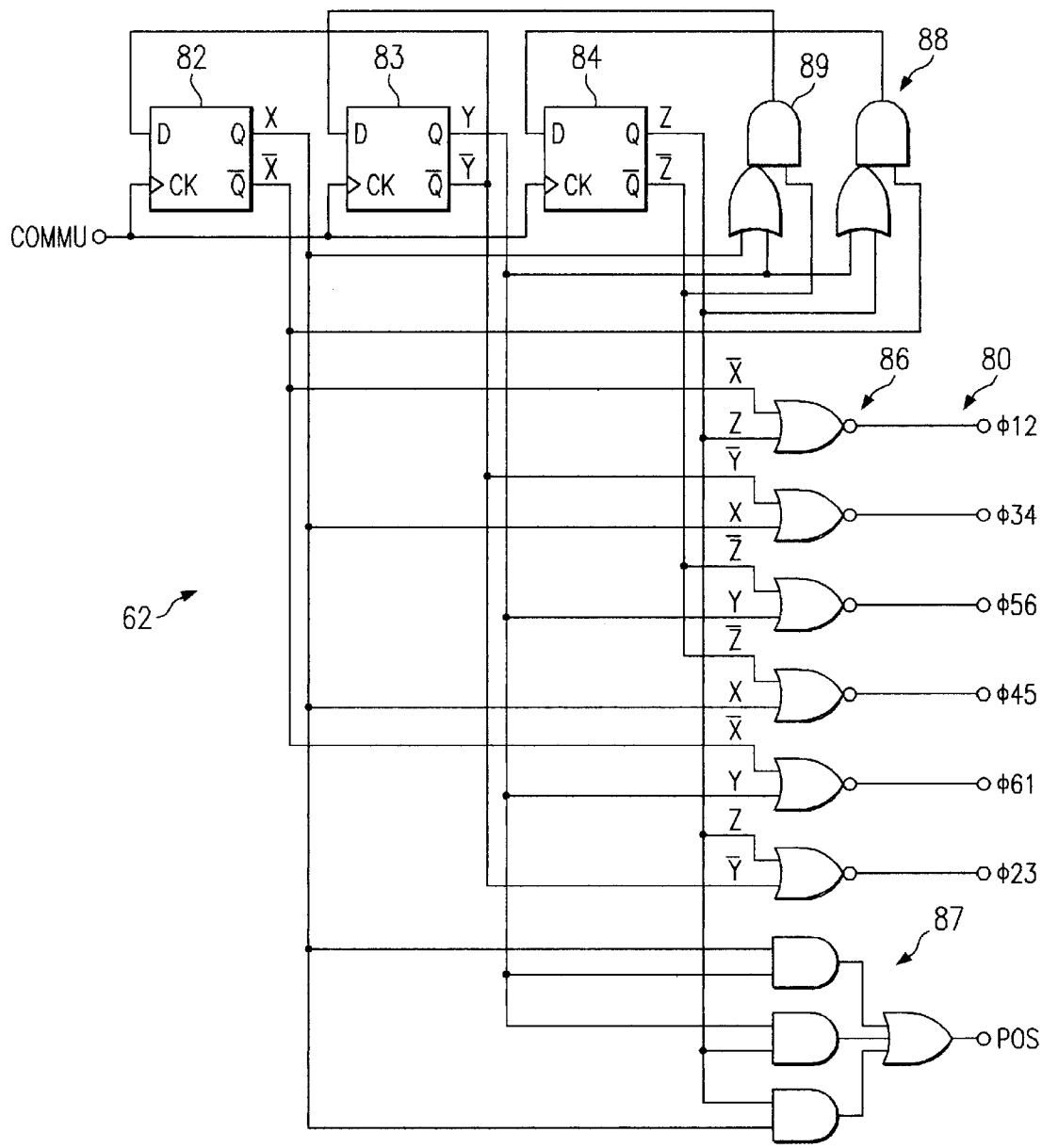
FIG. 3 shows an electrical schematic diagram of a circuit to generate the currents of the slew-rate controlled power amplifiers of FIG. 2.

At any given time, one of the high-side power FETs 70–72, and one of the low-side power FETs 74–76 are conducting so that the motor current flows through the two windings in their path. The third winding is tri-stated and dc biased at one-half of the supply voltage. The commutation state machine 62 controls the sequence of commutation with its six digital outputs Φ12, Φ23, Φ34, Φ45, Φ56, and Φ61. A circuit schematic that generates the output signals Φ12, Φ23, Φ34, Φ45, 101 56, and Φ61 on line 80 is shown in FIG. 3, to which reference is now additionally made. It should be noted that Φ12 is enabled for both commutation states of Φ1 and Φ2, etc.

The input signal COMMU is applied to clock D-type flip-flops 82–84. The respective X, Y, and Z outputs from each of the flip-flops, and the inverted X, Y, and Z outputs are provided to a logic gate array 86 to produce the outputs Φ12, Φ23, Φ34, Φ45, Φ56, and Φ61. Additionally, the X, Y, and Z outputs are provided to a logic gate 87 to produce the output POS, which controls the operation of the current waveform generator 54. Furthermore, the X and X (bar) outputs and Z and Z (bar) outputs are connected to gates 88 and 89, the outputs of which are fed back respectively the inputs of flip flops 84 and 83. The inverted Y output of flip-flop 83 is fed back to the input of flip-flop 82.

Figure 4:
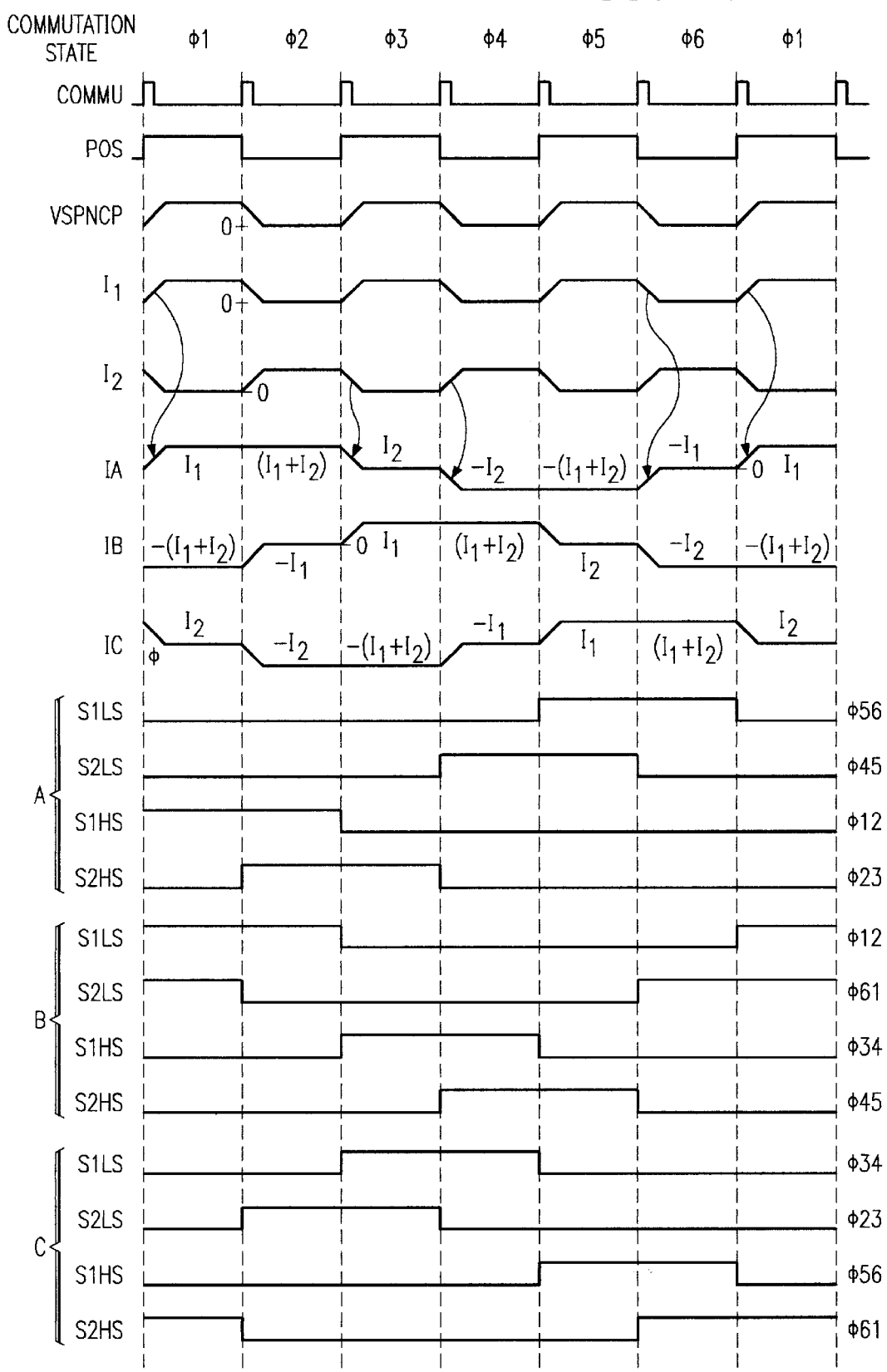
FIG. 4 is a timing diagram of the control signals generated in FIG. 3.

The principles of operation of the commutation state machine 62 is explained with additional reference to FIG. 4, which is the timing diagram of the control signals generated by the circuit of FIG. 3. The POS signal controls the charging and discharge of the slew rate setting capacitor $C_{SLEW}$. The POS signal toggles on every transition of commutation states. This results in the trapezoidal waveform of VSPNCP, which represents the voltage at $C_{SLEW}$. Two currents I1 and I2 are then generated. It should be noted that I2 is exactly the reciprocal of I1 and the sum of these two current sources is a constant value, I.

During Φ1, the high-side driver of the winding "A" is sequenced to turn on while the high-side driver of the winding "C" is sequenced to shut off. In this state, I1 is required for the high-side driver of "A" and I2 for the high-side driver of "C". Also, the constant current I is required for the low-side driver of "B", which can be accomplished by provided both I1 and I2 to the driver. It should be noted that the negative sign of the current (I1+I2) in this state indicates that the current flows through the low-side driver of "B". It should be also noted that in this state the high-side drivers are switching. In the next state, Φ2, the low-side drivers are switching. More particularly, the low-side driver of the winding "C" is sequenced to turn on while the low-side driver of the winding "B" is sequenced to shut off. In this state, the high-side driver of the winding "A" maintains a constant current. Thus, I2, in addition to the existing current I1, is added to the high-side driver of "A", while I2 is removed from the low-side driver of "B". Furthermore, I2 is provided to the low-side driver of "C" (it was provided to the high-side driver in the previous state). This process is continued through all of six commutation states and then repeated.

To properly operate the power amplifier associated with its respective winding during any commutation state, four control signals are generated, namely, S1LS, S2LS, S1HS, and S2HS associated with each power amplifier, where LS stands for low-side, HS for high-side, S1 for enabling I1, and S2 for enabling I2. The following Table II shows the complete sequence of control signals for the power amplifiers associated with three phases.

TABLE II

| | S1LS | S2LS | S1HS | S2HS |
|---|---|---|---|---|
| Phase A | φ56 | φ45 | φ12 | φ23 |
| Phase B | φ12 | φ61 | φ34 | φ45 |
| Phase C | φ34 | φ23 | φ56 | φ61 |

Figure 5:
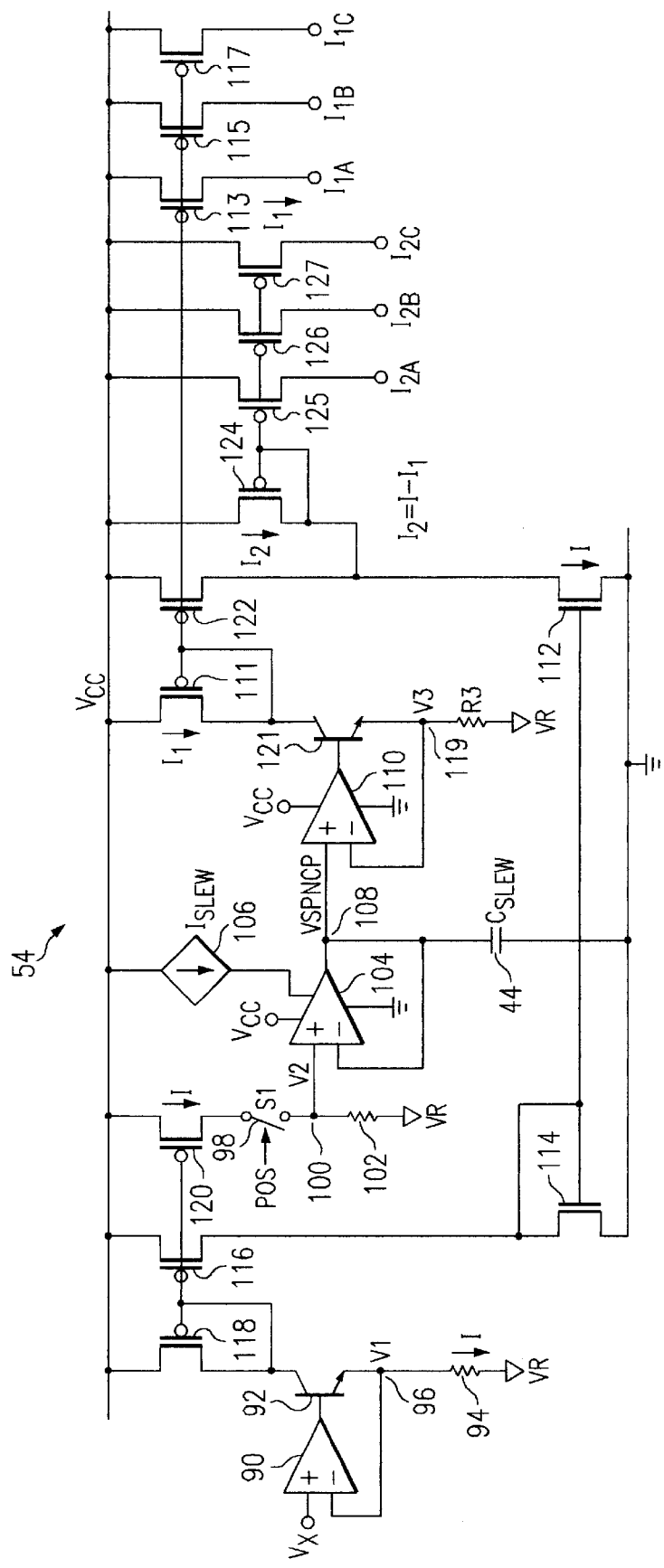
FIG. 5 is an electrical schematic diagram of a current waveform generator of FIG. 2.

The current waveform generator 54 of FIG. 2 is shown in FIG. 5, to which reference is now additionally made. The output of the error amplifier 48 is provided to an OTA 90, as an input voltage at $V_X$. The input voltage $V_X$ is converted into a current I by the OTA 90, in conjunction with transistor 92, PMOS 118, and resistor 94. The high gain of the OTA 90 forces V1 on node 96 to be substantially equal to the input voltage $V_X$. The current I will be converted back to a voltage equal to V1 while a current switch 98, which is controlled by the POS signal, is closed. Conversely, whenever the POS is low, the current switch 98 is open, and the voltage V2 on node 100 is quickly discharged to VR through resistor 102.

It is noted that VR sets the voltage reference for the level portion of the curve. Thus, the voltage V2 follows a similar waveform as the waveform of POS, but with its high value equal to $V_X$ and its low value equal to VR. As can-be seen from the waveforms shown in FIG. 4, described below, the signal POS is synchronized with the signal COMMU; consequently, the output from the circuit 54 is synchronized with the commutation states generated by the commutation state machine 62, described above.

The voltage V2 on node 100 is then applied to the slew-setting OTA 104, configured as a unity-gain amplifier, whose charging and discharging current to the holding capacitor $C_{SLEW}$ 44 are controlled by a dependent current source $I_{SLEW}$ 106. In this manner, the current $I_{SLEW}$ as well as the capacitor $C_{SLEW}$ determine the rate of changes on both low-to-high and high-to-low transitions at node 108, as signal VSPNCP.

It is noted that the final value of VSPNCP is equal to V1, and therefore, $V_X$, due to the high gain of the amplifier 104. Finally, the voltage waveform VSPNCP is converted back into a current I1 by a third OTA 110, which generates a current I1 that is mirrored in mirror transistors 113, 115, and 117 to produce three identical currents, I1A, I1B, and I1C for three slew rate controlled power amplifiers, respectively.

In a second current path, the current I is duplicated in NMOS transistor 112 through NMOS transistor 114 and PMOS transistors 116 and 118. The current in NMOS transistor 112, which is equal to I, subtracts the current in PMOS transistor 122, resulting in a current I2=I−I1 that flows through PMOS transistor 124. In a similar manner as I1, the current in PMOS transistor 124 is mirrored in mirror transistors 125, 126, and 127 to produce three identical current sources, I2A, I2B, and I2C for three slew rate controlled power amplifiers, respectively.

Figure 6:
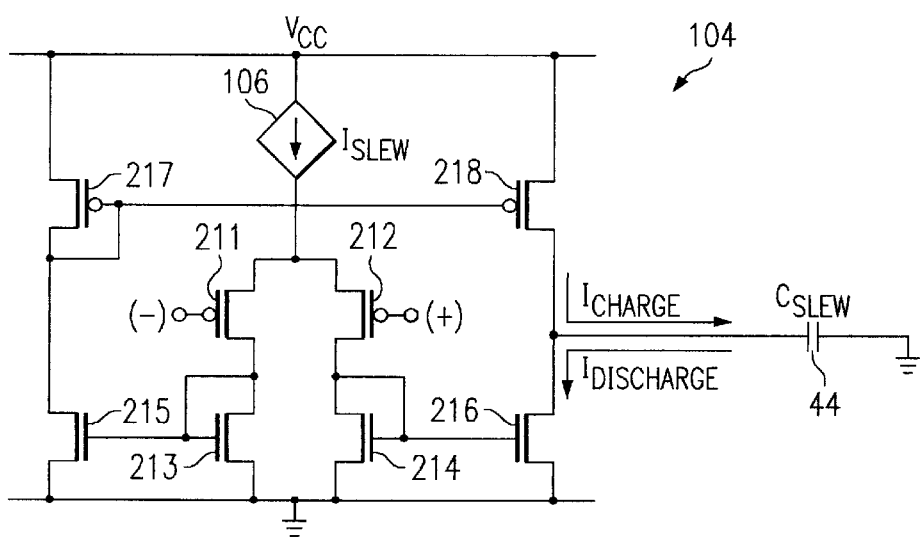
FIG. 6 shows a simplified electrical schematic diagram of the slew-setting OTA of FIG. 5.

A simplified electrical schematic diagram of the slew-setting OTA 104 of FIG. 5 is shown in FIG. 6. The slew rate of the output voltage is determined by $I_{SLEW}$ produced by the dependent current source 106 and the capacitor $C_{SLEW}$ 44. The dominant pole of this single-stage circuit is also set by the capacitor $C_{SLEW}$ 44.

Thus, the manner by which the circuit of FIG. 5 generates the respective currents is by charging and discharging the capacitor $C_{slew}$ 44 with the current $I_{slew}$ through the operational transconductance amplifier 104. The voltage V2 on node 100 on the noninverting input of the OTA 104 is established by the voltage across resistor 102. When the switch Si is closed by signal POS (see the waveforms described in FIG. 4 above) the current I generated in through resistor 94 is mirrored by mirror transistors 118 and 120 to create the reference current in resistor 102. The current I is also mirrored by mirror transistors 114 and 112, so that the current I flows in the circuit including transistor 112.

The output from the transconductance amplifier 104 is a voltage that is applied to the noninverting input of the amplifier 110. The output of the amplifier 110 drives the base of an emitter-follower transistor 121 through which current I1 flows. The magnitude of I1 is controlled by a voltage output from the amplifier 104. Thus, the slew rate of currents I1 and I2 is equal to $I_{slew}$ divided by $R3 \times C_{slew}$. The output current I1 is mirrored by mirror transistors 113, 115, and 117 to produce I1A, I1B, and I1C, respectively. The current I is the sum of I1 and I2. Thus, I2. (which is the inverted value of I1 at any instant) is equal to the total current I minus I1. Similarly, the output current I2 is mirrored by mirror transistors 125, 126, and 127 to produce I2A, I2B, and I2C, respectively.

For simplicity, a constant current source may be used for $I_{SLEW}$. However, the slew rate of VSPNCP and thus I1 and I2 will vary significantly with process and temperature, as explained later. To maintain a tight tolerance of the slew rate, a dependent current source $I_{SLEW}$ may be designed to compensate for the process and temperature variations. For example, if it be assumed that the actual values of on-chip resistors are 10% larger than their nominal values, the voltage V3 on node 119 (FIG. 5) has to be approximately 10% higher than its nominal value in order to produce the same magnitude of current in I1, as dictated by the current control loop. If a constant ISLE is used, 10% more time than the nominal is required to charge/discharge VSPNCP. This will results in a slower slew rate of I1 and I2. However, if $I_{SLEW}$ is: 10% larger than its nominal value, then it takes the same amount time to charge/discharge VSPNCP for the case where on-chip resistors is 10% larger than its nominal value. Therefore, the same slew rate of current can be maintained.

Figure 7A:
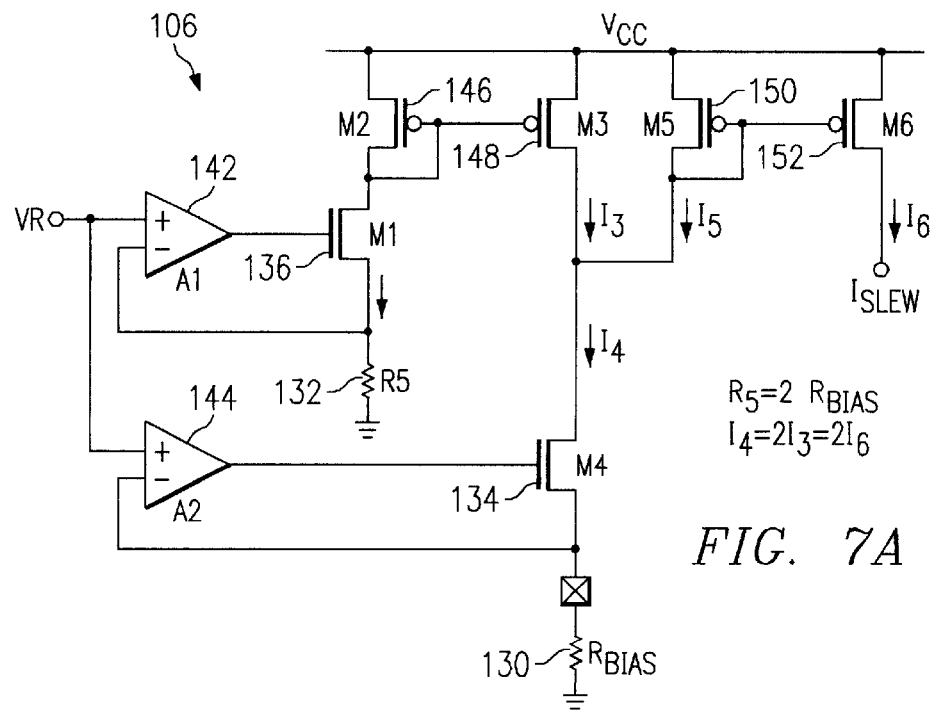
FIGS. 7A and 7B shows two alternative implementations for the compensated slew-setting current generator used in the circuit of FIG. 5.
Figure 7B:
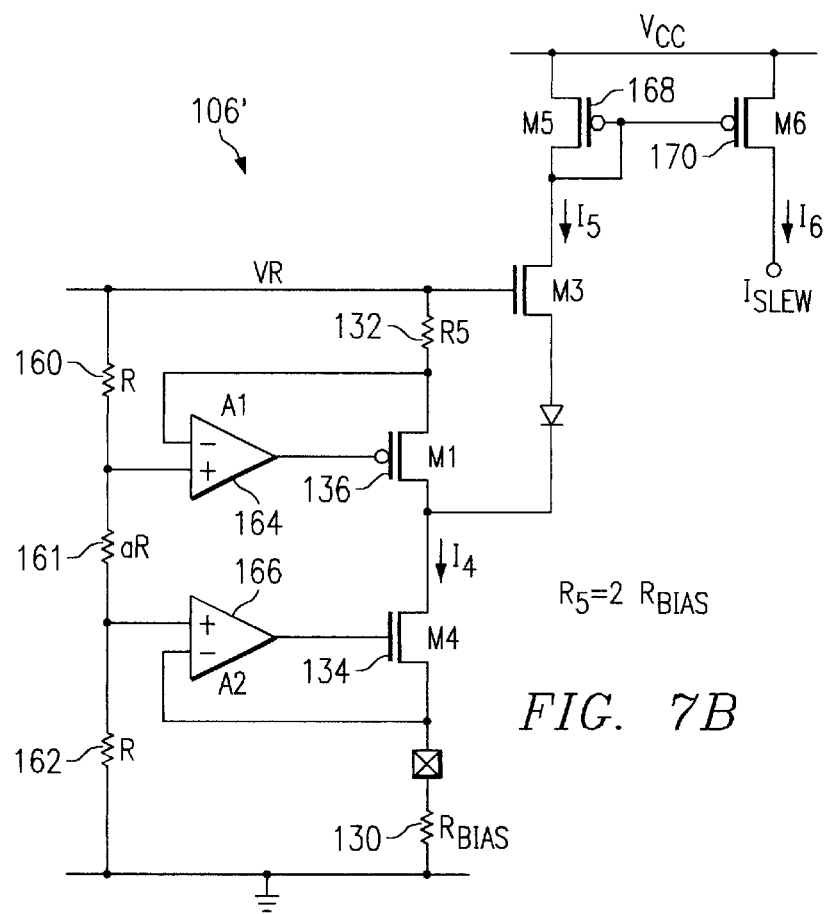

FIGS. 7A and 7B, to which reference is now additionally made, show two alternative implementations to construct the compensated slew-setting- current generator 106 used in the circuit of FIG. 5. In both figures, resistor $R_{BIAS}$ 130 is an external resistor and resistor 132 is an on-chip resistor. VR is the reference voltage, which remains constant over process and temperature variations. Typically, the value of resistor 132 is set at twice of the value of $R_{BIAS}$ 130, so that the current in MOS transistor 134 is twice of the current in MOS transistor 136. However, the current in MOS transistor 136 is a function of process and temperature, while the current in MOS transistor 132 is a constant over process and temperature variations. If resistor 132 is 10% larger than its nominal value, the current I3 will be approximate 10% smaller and therefore the current I5 and then I6 will be approximate 10% larger than their nominal values.

With reference now to FIG. 7A, the compensated, slew setting current generator 106 includes two OTAS 142 and 144, each having a noninverting input connected to a reference voltage VR. The output of the OTA 142 is connected to an NMOS transistor 136 to control the current flowing through transistor 136. The current in transistor 136 passes through the resistor 132 and a first mirror PMOS transistor 146. A second current path is provided which includes the NMOS transistor 134 and bias resistor 130 together with a PMOS transistor 148 in which the current flowing through PMOS transistor. 146 is mirrored as current I3. An output current mirror, which includes PMOS transistors 150 and 152, is provided. The current flowing through PMOS transistor 150 is added to the current I3 flowing in PMOS transistor 148 to produce a current I4 through the NMOS transistor 134 and the bias resistor 130. The output current $I_{SLEW}$, also designated as current I6, flowing through PMOS mirror transistor 152 mirrors current 5I, which is established as the net current between I3 and I4.

A similar arrangement is used in the alternative embodiment of the compensated slew setting current generator 106', shown in FIG. 7B, to which reference is now made. AS shown, a voltage divider network that includes voltage divider resistors 160–162 is connected to the noninverting inputs of two OTAS 164 and 166. The outputs of the OTAS 164 and 166 are connected respectively to the PMOS transistor 136 (through which a current I3 flows) and NMOS transistor 134 (through which a current I4 flows). Resistors 132 and the bias resistor $R_{BIAS}$ 130 are connected in series with the transistors 136 and 134. A mirror circuit that includes PMOS mirror transistors 168 and 170 is provided. The output current $I_{SLEW}$ (also referred to as current I6) is derived from current I5, which is established as the net current between I3 and I4.

With reference again to FIG. 6, the capacitor $C_{SLEW}$ 44 is charged or discharged depending upon the input voltage applied to the differential pair of the OTA 104. Assume that the current switch Si in FIG. 5 is open initially. The voltage V2 will be held at VR since no current is flowing through resistor 102. Once the switch S1 is closed by signal POS, the voltage V2 is quickly established by the current I flowing through resistor 102. This positive-going step (with respect to VR) at the noninverting input of the amplifier 104 will steer all the tail current $I_{SLEW}$ flowing through NMOS 213. This current is then mirrored to the transistors 215, 217, and 218 while NMOS 214 and 216 is turned off, thereby allowing the capacitor $C_{SLEW}$ to be charged by a current substantially equal to $I_{SLEW}$. The capacitor remains to be charged by the same amount of current until the voltage VSPNCP reaches a value that is fairly close to the voltage V2. At this time, since V2 is fairly close to VSPNCP, the tail current $I_{SLEW}$ will be split into two equal amounts flowing through NMOS 213 and 214 individually. This results in an equal amount of current, one half of $I_{SLEW}$, flowing through PMOS 218 and NMOS 216. Therefore, the voltage VSPNCP will remain constant until the switch SI is opened.

Once the current switch S1 is opened by signal POS, the voltage V2 will be quickly discharged to VR. Since the voltage VSPNCP was charged to a larger value, this negative-going step (with respect to VR) at the noninverting input of the amplifier 104 will steer all-the tail current $I_{SLEW}$ flowing through NMOS 214. This current is then mirrored to NMOS 216 while PMOS 218 is turned off, thereby allowing the capacitor $C_{SLEW}$ to be discharged by a current substantially equal to $I_{SLEW}$. In a similar manner as described in the charging process, the capacitor remains to be discharged by the same amount of current until the voltage VSPNCP reaches a value that is fairly close to VR, and then remains constant until the switch S1 is closed again.

This process of charging and discharging the capacitor $C_{SLEW}$ is repeated and controlled by signal POS, thus generating a voltage waveform at VSPNCP that is not only synchronized with the commutation states and but also with a user-defined slew rate on both positive- and negative-going edges. It is noted that a filter network can be easily employed at VSPNCP to further smooth out the voltage waveform at VSPNCP before it is applied to the noninverting input of the amplifier 110.

Figure 8:
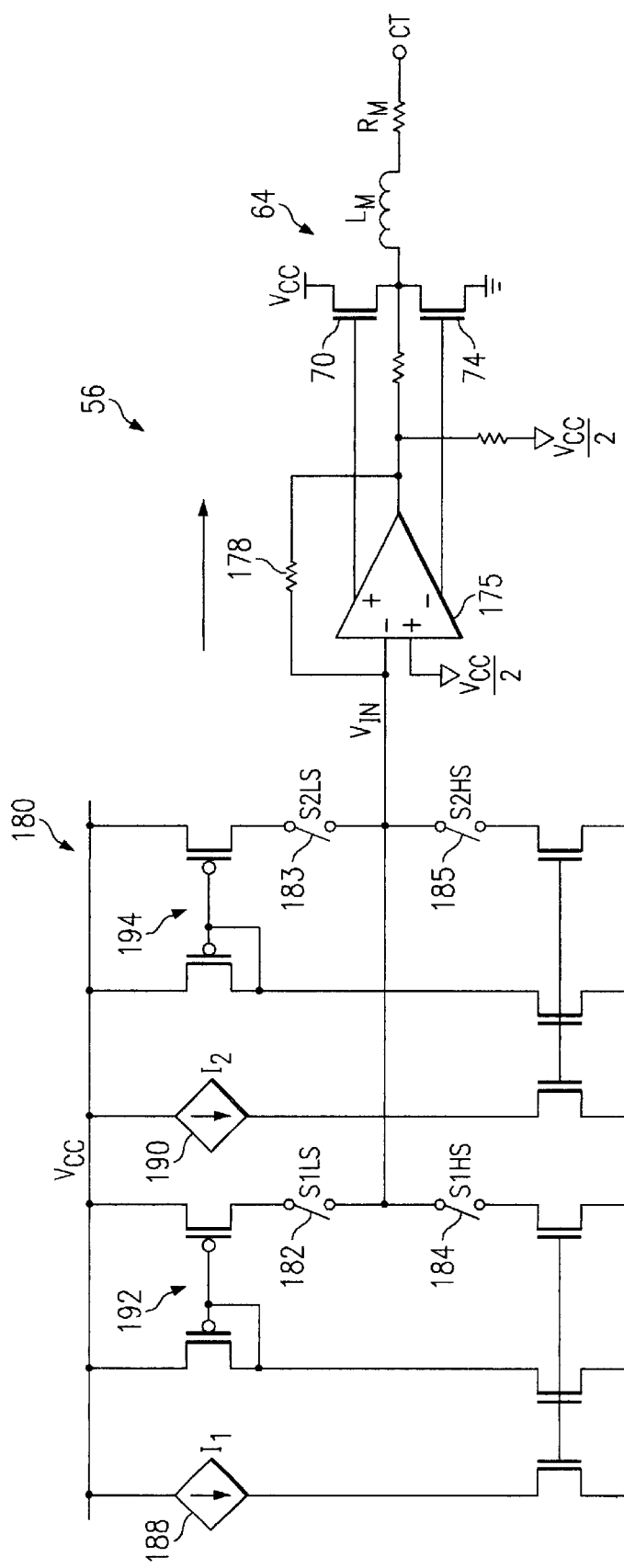
FIG. 8 shows a simplified electrical schematic circuit diagram of one of the identically constructed slew rate controlled power amplifiers of FIG. 2.

FIG. 8 shows a simplified circuit diagram of one of the identically constructed slew rate controlled power amplifiers 56, 58, or 60 of FIG. 2. The I1 and I2 currents are generated from the current waveform generator 54, and the four control signals S1LS, S2LS, S1HS, and S2HS are from the commutation state machine 62, as described above, The commutation state machine 62 controls the current flowing into or out of the inverting node of the power amplifier 175. This current also flows through a feedback resistor 178.

The noninverting node of amplifier 175 is biased at VCC/2, one half of the supply voltage VCC. The power amplifier controls the gate voltages for both high and low-side power FETs 70 and 74, so that the rationed magnitude of the current in power FETs is maintained. It should be noted that the current in the power FETs is "β" times of the current flowing through the feedback resistor 178. If the current flows in the direction as indicated, then the low-side power FET 74 is conducting and the high-side FET 70 is off. Conversely, if the current flows in the opposite direction, then the high-side power FET 70 is conducting and the low-side FET 74 is off. If there is no current in the feedback resistor 178, then both high and low-side FETs 70 and 74 are tri-stated, except a very small amount of quiescent current flows through both FETs. In this case, the phase voltage of the associated winding is dc biased at one half of the supply voltage and will follow closely in sinusoidal waveform the back emf voltage developed on the associated winding.

The slew rate controlled power amplifier 56 includes a current multiplexer circuit 180, to which the signals S1LS, S2LS, S1HS, and S2HS are respectively applied to switches 182–185. Currents from dependant current sources 188 and 190 are mirrored by mirror circuits 192 and 194 for selective application to the inverting input of the amplifier 175. The application of the waveforms to the motor is accomplished by operating in appropriate sequence the switches S1LS, S1HS, S2LS, and S2HS. The signals that actuate those switches are shown in FIG. 4 in the lower waveform graphs. The respective commutation signals are developed by the state machine of FIG. 3.

Thus, the output from the circuit of FIG. 8 is applied to the coils of the motor in response to voltages produced in the various current mirrors that use I1 and I2, in conjunction with the commutative switching arrangement provided by the four switches S1LS 182, S1HS 184, S2LS 183, and S2HS 185. By controlling which of those switches is closed, the currents I1 and I2 are added singly, in either positive or negative direction of current. When they are positive, a constant current flows through the high-side power FET 70, thus raising the output from the amplifier 175. When they are in the opposite direction, a constant current flows through the low-side power FET 74, thus lowering the output from the amplifier 175.

Figure 9:
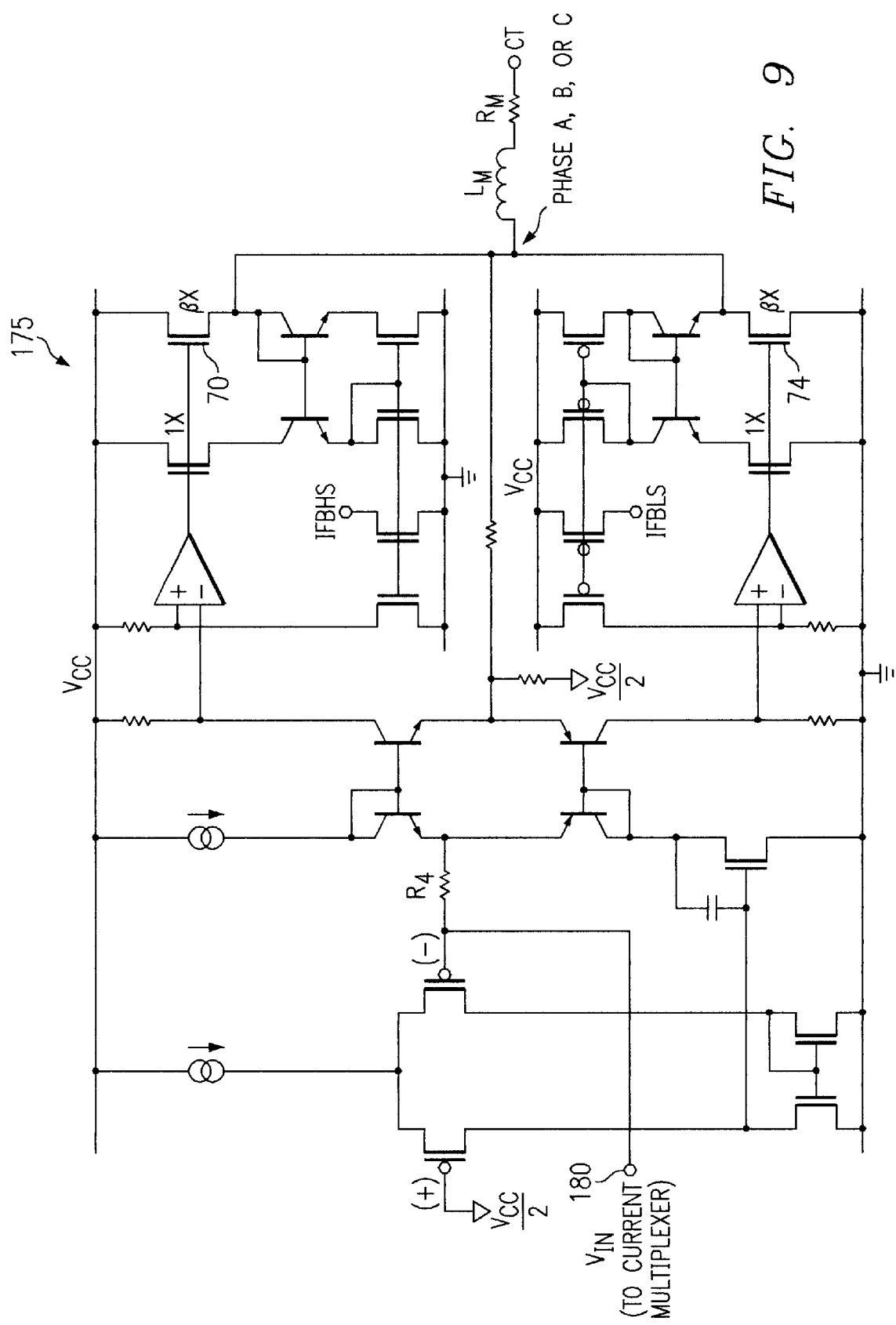
FIG. 9 is shows a detailed electrical schematic circuit diagram of the final amplifier of the slew rate controlled power amplifier of FIG. 8.

FIG. 9 shows a detailed electrical schematic circuit diagram of amplifier 175 of FIG. 8. In FIG. 9, transistors βX 70 and 74 correspond to the upper and lower power FETs of FIG. 8. The respective driver circuits for each are shown, labeled IFVHS and IFVLS, respectively, for the upper and lower driver circuits. The circuit of FIG. 9 represents a current-mode power amplifier, which operates to turn on and off the driver circuits in response to the input current flowing into or out of the inverting node of the amplifier 175.

Figure 10:
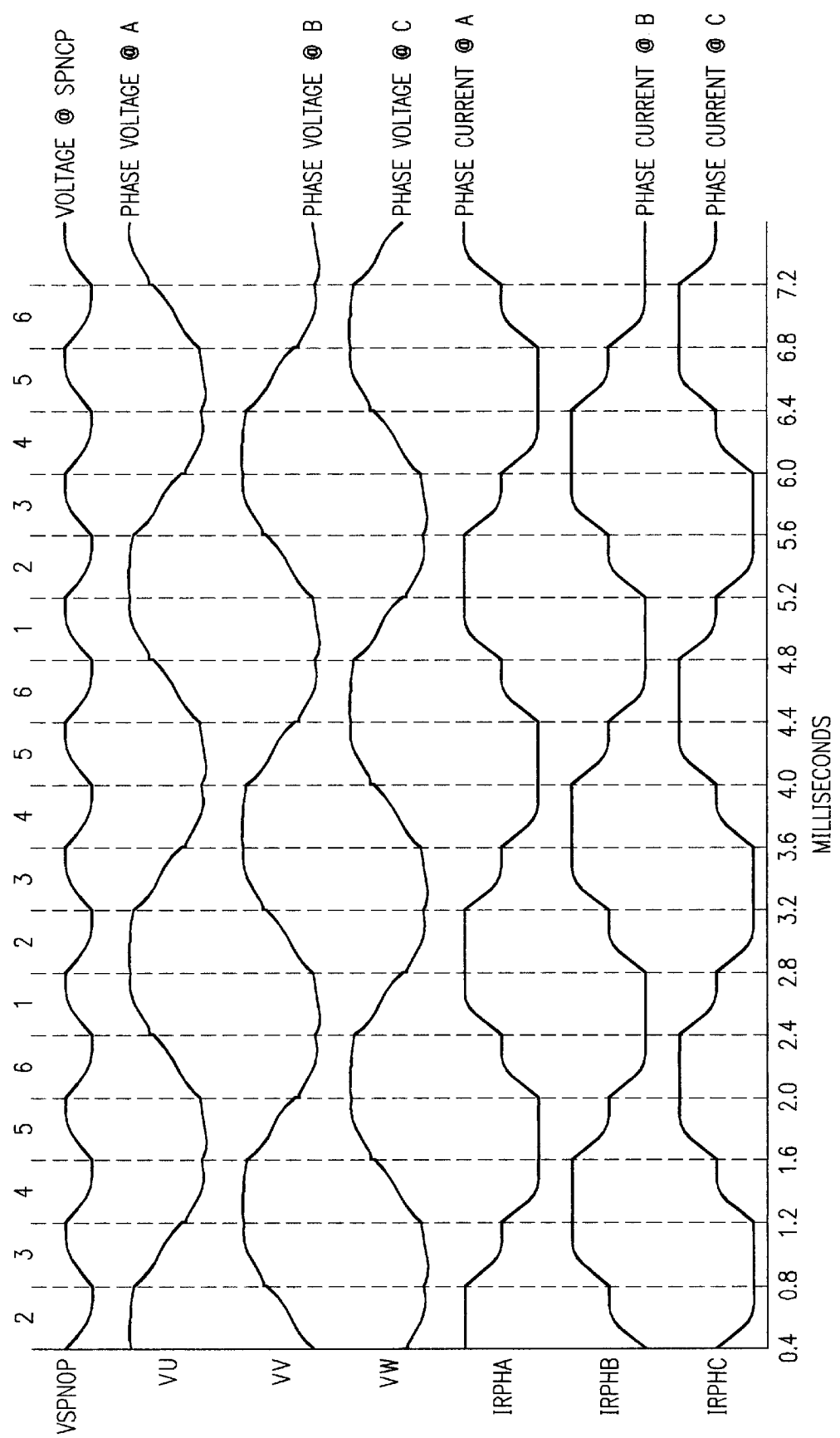
FIG. 10 is a graph depicting the transient response obtained in the analysis of the spindle current control system used in a three-phase dc motor.

FIG. 10 depicts the transient response obtained in the analysis of the complete spindle current control system for use in a 3-phase dc motor. More particularly, FIG. 10 shows graphs of individual phase current vs. time and individual phase voltage vs. time that are realized in the operation of the circuit of FIG. 2 of the invention. The spindle current in each winding is set to 100 mA and the slew rate of current to 0.5 mA/us. The spindle back emf voltage developed on the windings is set to 3.5 V peak-to-peak in an ideal sinusoidal waveform. AS shown in the plot, the phase current follows the linear ramp linearly while the phase voltage exhibits a sinusoidal- waveform closely without high-frequency spikes.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for providing drive currents to a polyphase dc motor, comprising:
 a circuit for generating a user-defined waveform first signal in synchronism with a reference frequency signal;
 a reference frequency signal generator for generating pulses of a second signal at a reference frequency;

a commutation circuit for combining the first and second signals to form a sinusoidal/trapezoidal combined waveform; and a circuit for applying the sinusoidal/trapezoidal combined waveforms to coils of the polyphase dc motor during run time in a commutative sequence.

2. The circuit of claim 1 wherein said user-defined waveform has a linear ramp waveform.

3. The circuit of claim 1 wherein said polyphase dc motor is a three-phase dc motor.

4. A method for operating a polyphase dc motor, comprising:

generating a commutation waveform;

generating a user-defined waveform in synchronism with said commutation waveform;

combining said commutation waveform and said user waveform to produce a sinusoidal/trapezoidal combined waveform; and applying sinusoidal/trapezoidal combined waveform to the windings of the motor during run time.

5. The method of claim 4 wherein said generating a user-defined waveform comprises generating a waveform that has a linear ramp shape.

6. A method for reducing acoustic noise in operating a polyphase dc motor, comprising:

generating a commutation waveform;

generating a user-defined waveform in synchronism with said commutation waveform;

combining said commutation waveform and said user waveform to produce a sinusoidal/trapezoidal combined waveform; and applying the sinusoidal/trapezoidal combined waveform to the windings of the motor during run time.

7. The method of claim 6 wherein said generating a user-defined waveform comprises generating a waveform that has a linear ramp shape.

8. A disk drive product of the type having a polyphase dc motor for rotating a data containing media, comprising:

a circuit for generating a user-defined waveform first signal in synchronism with a reference frequency signal;

a reference frequency signal generator for generating pulses of a second signal at a reference frequency;

a commutation circuit for combining segments of the first and second signals to form a sinusoidal/trapezoidal combined waveform;

a circuit for applying the combined sinusoidal/trapezoidal waveforms to coils of the polyphase dc motor during run time in a commutative sequence.

9. The disk drive product of claim 8 wherein said circuit for generating a user-defined waveform generates a waveform that has a linear ramp shape.

10. The disk drive product of claim 8 wherein said circuit for generating a user-defined waveform generates a waveform, which, when combined with said second signal, has approximately a sinusoidal/trapezoidal waveform.

11. A disk drive product of the type having a three phase dc motor for rotating a data containing media, comprising:

a plurality of circuits, each for driving a respective set of motor coils during a motor phase, including:

a current waveform generator for generating a user-defined waveform first signal in synchronism with a reference frequency signal;

a commutation state machine for generating commutated motor driving second signals;

a slew rate controlled power amplifier connected to combine said first and second signals to produce sinusoidal/trapezoidal driving signals to said respective set of motor coils during run time.

12. The disk drive product of claim 11 wherein said current waveform generator comprises a capacitor for controlling a slew rate of said first signal.

13. The disk drive product of claim 11 wherein said current waveform generator generates a waveform that has a linear ramp shape.

14. The disk drive product of claim 11 wherein said current waveform generator generates a waveform, which, when combined with said second signal, has approximately a sinusoidal/trapezoidal waveform.

15. A slew voltage generator, comprising:

a slew setting current generator for controlling a drive current to a polyphase dc motor, including:

first and second differential amplifiers, each having a noninverting input connected to a reference voltage;

a first transistor connected to be controlled by an output of said first differential amplifier in a first current path;

a resistor in said first current path to develop a first feedback voltage to an inverting input of said first differential amplifier;

a first current mirror to create a second current path to mirror a current in said first current path; a bias resistor in said second current path to develop a second feedback voltage to an inverting input of said second differential amplifier;

a second transistor in said second current path connected to be controlled by an output of said second differential amplifier in said second current path;

an output current mirror connected to mirror a current in said second current path, wherein the current flowing through a transistor of said output current mirror is added to a current in said second current path;

wherein said output current mirror produces a current through the second transistor and the bias resistor to generate an output current that is dependent upon said reference voltage; and a slew capacitor charging and discharging circuit, said slew capacitor charging and discharging circuit, comprising:

fifth and sixth current paths, said output current of said slew setting current generator being connected to provide a supply current to be divided between said fifth and sixth current paths;

control transistors in said fifth and sixth current paths to steer said output current between said fifth and sixth current paths depending upon a control voltage; and seventh and eighth current paths connected respectively to mirror current in said fifth and sixth current paths and connected to deliver current to or sink current from said slew capacitor depending upon which current path to which said supply current is steered.

16. The slew voltage generator of claim 15 wherein said first and second transistors are MOS transistors.

17. A slew voltage generator, comprising:

a slew setting current generator for controlling a drive current to a polyphase dc motor, including:

first and second differential amplifiers, each having a noninverting input connected to respective reference voltages;

first and second transistors connected to be controlled by respective outputs of said first and second differential amplifiers in a first current path;

first and second resistors in said first current path to develop first and second feedback voltages to respective inverting inputs of said first and second differential amplifiers;

a third transistor in a second current path, current through said third transistor being controlled by a reference voltage;

a first current mirror to mirror current in said second current path connected to add a current to a current in said first current path through said second transistor and provide a third current path in which a slew controlling current output is generated proportional to said current in said second current path that is dependent upon said reference voltage;

a slew capacitor charging and discharging circuit, said slew capacitor charging and discharging circuit comprising:

fourth and fifth current paths, said output current of said slew setting current generator being connected to provide a supply current to be divided between said fourth and fifth current paths;

control transistors in said fourth and fifth current paths to steer said output current between said fourth and fifth current paths depending upon a control voltage; and sixth and seventh current paths connected respectively to mirror current in said fourth-and fifth current paths and connected to deliver current to or sink current from said slew capacitor depending upon which current path to which said supply current is steered.

18. The slew voltage generator of claim 17 wherein said first, second, and third transistors are MOS transistors.

* * * * *